United States Patent [19]
Smallwood

[11] 3,797,161
[45] Mar. 19, 1974

[54] STORAGE BOX FOR FISHING LURES

[76] Inventor: Ross H. Smallwood, 2935 S. Peoria, Tulsa, Okla. 74114

[22] Filed: Nov. 10, 1972

[21] Appl. No.: 305,278

[52] U.S. Cl............................................ 43/57.5 R
[51] Int. Cl............................................. A01k 97/06
[58] Field of Search...... 119/54.5 R, 57.5 R, 57.5 A

[56] References Cited
UNITED STATES PATENTS

| 952,314 | 3/1910 | Ellsworth | 43/57.5 R |
|---|---|---|---|
| 1,815,568 | 7/1931 | Jacqmein | 43/57.5 R |
| 2,220,817 | 11/1940 | Holmes | 43/57.5 R |
| 3,182,872 | 5/1965 | Brosseau | 43/57.5 R X |
| 3,377,736 | 4/1968 | Woolworth | 43/57.5 R |
| 3,512,295 | 5/1970 | La Barge | 43/57.5 R |
| 3,350,810 | 11/1967 | Warner et al. | 43/57.5 R |
| 2,711,050 | 6/1955 | McIntyre | 43/57.5 R |

Primary Examiner—Louis G. Mancene
Attorney, Agent, or Firm—Head & Johnson

[57] ABSTRACT

A tackle box for housing fishing lures including a box lower portion, a hinged upper portion, and a plurality of vertical panels spaced apart and parallel from each other positioned in the bottom box portion, the upper edge of each of the panels having a plurality of vertical spaced apart slots of sufficient width to receive the wire or hook portion of a fishing lure.

2 Claims, 3 Drawing Figures

STORAGE BOX FOR FISHING LURES

BACKGROUND, SUMMARY AND OBJECTS OF THE INVENTION

A popular type of fishing lure in use today is that referred to as a "spinning" lure. The typical spinning lure is formed of a wire bent in the form of a V. The fishing line is hooked to the portion forming the apex of the V. A common arrangement is that in which the wire is bent to form a loop at the apex of the V, with the fishing line being attached to the loop. One leg of the V-shaped wire has a lure body portion affixed to it. The body portion may be of virtually limited different configurations. Typically, the body portion includes a weight which may be formed of lead, and is usually shaped in a contoured form so as to appear like a small fish, a bug, or the like. The body includes a hook extending therefrom, and in addition, typically includes a skirt portion formed of hair, feathers, strips of rubber or plastic, or the like. The opposite leg of the V wire forming the lure normally has attached to it a spinner. The hook extending from the body normally extends in the direction of the wire having the spinner attached to it so that the lure is essentially weedless, that is, less apt to become entangled in weeds or brush. This type of fishing lure is very effective, however, it does not fit well in the normal tackle box. Because of the wire shape it is essentially flat but consumes substantial area if layed in a normal flat bottom drawer. The biggest problem is that spinning lures placed together in a flat bottom drawer become tangled with each other. Paint or other finish is easily scratched from the body surfaces and the skirting material becomes tangled and crimped so that the lure, when used in the water, does not give the best appearance and performance for which it was designed.

Spinning lures can be satisfactorily carried in a tackle box, having drawers or cubicles of sufficient size so that a single lure can lay horizontally, however, to carry any number of lures in this manner requires an exceedingly large box which is not only clumsy to the fisherman, but also expensive.

In addition to spinning lures, this invention is directed towards a box for carrying other types of lures.

An object of this invention is to provide a fishing tackle box designed for carrying and storing lures and is particularly useful for storing lures of the spinning type.

Another object of this invention is to provide a tackle box for spinning lures arranged such that a large number of spinning lures may be stored in a tackle box of convenient size in an arrangement wherein the lures do not become entangled with each other and wherein skirt portions of the lures are not crimped or damaged and the body portions are not likely to be marred or scratched.

Another object of this invention is to provide a tackle box for fishing lures including an arrangement wherein the lures do not become entangled with each other, even if the box is overturned.

These general objects, as well as more specific objects of the invention, will be fulfilled in the following description and claims, taken in conjunction with the attached drawings.

DESCRIPTION OF THE VIEWS

DETAILED DESCRIPTION

Figure 1:
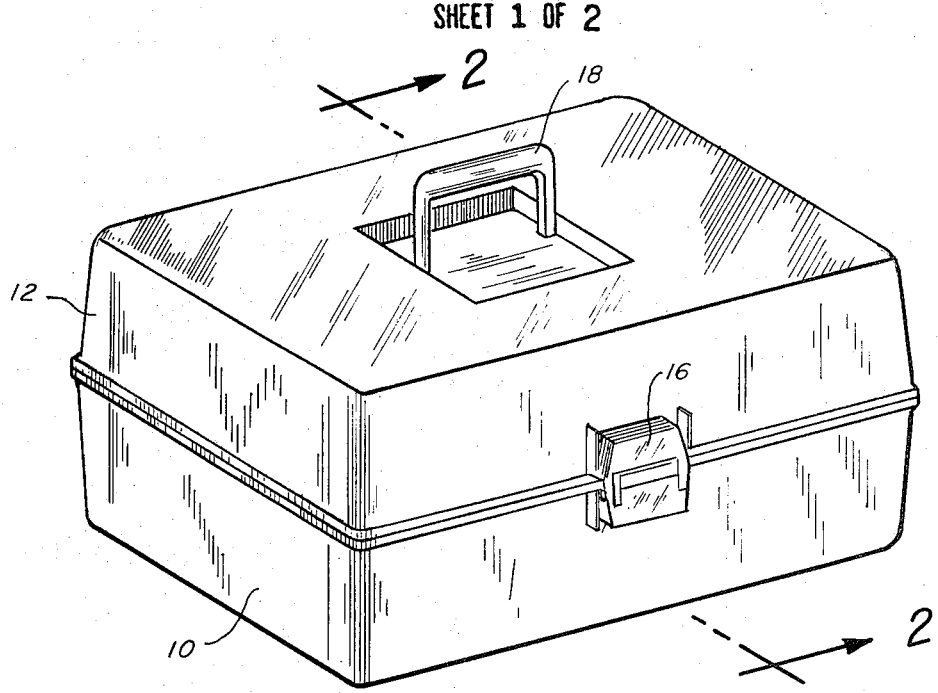
FIG. 1 is an isometric external view of a tackle box which may typically be employed in practicing the invention, it being understood that the actual external configuration or appearance of the box is not a part of the invention.
Figure 2:
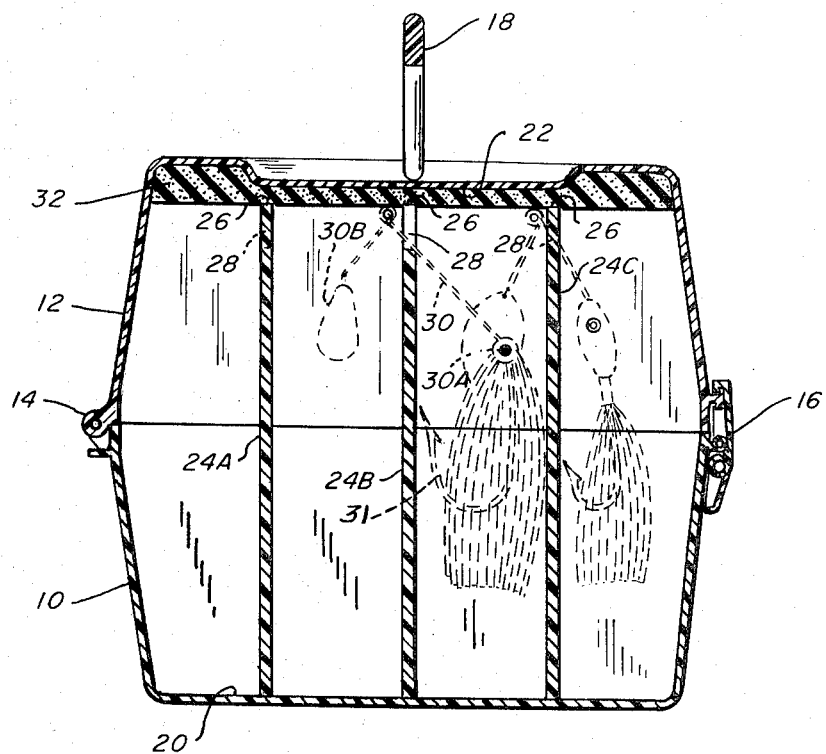
FIG. 2 is a cross-sectional view of a typical tackle box employing the invention as taken along the line 2—2 of FIG. 1.

Referring to the drawings and first to FIG. 1, an example of the way the invention may be practiced is illustrated although, as previously noted, the actual internal appearance, size and shape of the box may vary without departing from the invention. Generally the box includes a lower portion 10 and an upper portion 12. The upper portion is hinged or pivoted to the lower portion 10, as shown in FIG. 2, the numeral 14 denoting a hinge. A latch 16 keeps the box in closed position and a handle 18 permits the box to be easily carried. The box described to this point is not unlike that of any other typical tackle box.

As shown in FIG. 2, the lower portion 10 of the box has a bottom interior surface 20 and the upper portion 18 has an upper interior surface 22. Extending from the lower interior surface 20 is a plurality (in the illustrated case 3) of vertical panels 24A through 24C. The panels or partitions are spaced apart and parallel to each other and each terminates at an upper edge 26 which is adjacent and preferably substantially contiguous to the upper interior surface 22 of box upper portion 12. Each of the panels is provided at the upper edge 26 thereof with a plurality of spaced apart slots 28. The slots are of narrow depth in proportion to the total vertical height of the panels.

Each slot 28 is capable of receiving the wire or shank portion 30 of a spinning lure. With the wire portion in a slot 28 of a panel the body portion 30A of a lure which includes a hook 31 hangs on one side of the panel to which it is supported and the spinning portion 30B hangs on the other side. The slots 28 are preferably out of alignment with each other in adjacent parallel panels so that the portion of spinning lures supported by adjacent panels will not interfere with each other.

The two lures shown in dotted outline in FIG. 2 are by way of example and form no part of the invention.

As previously indicated, the upper edge 26 of each of the panels 24A through 24C terminates adjacent or contiguous to the upper interior surface 22 of box upper portion 12. This arrangement prohibits lure from being dislodged from a slot 28 as long as the lid 12 of the box is closed, even though the box be overturned. To further ensure complete absence of an opportunity for a lure from coming out of a slot 28 in which it is positioned, an alternate arrangement includes the use of a resilient pad 32 affixed to the upper box portion interior surface 22. The pad 32 engages the upper edges 26 of the panels 24 when the box is closed to ensure that a lure cannot be dislodged from the slot in which it is positioned.

Figure 3:
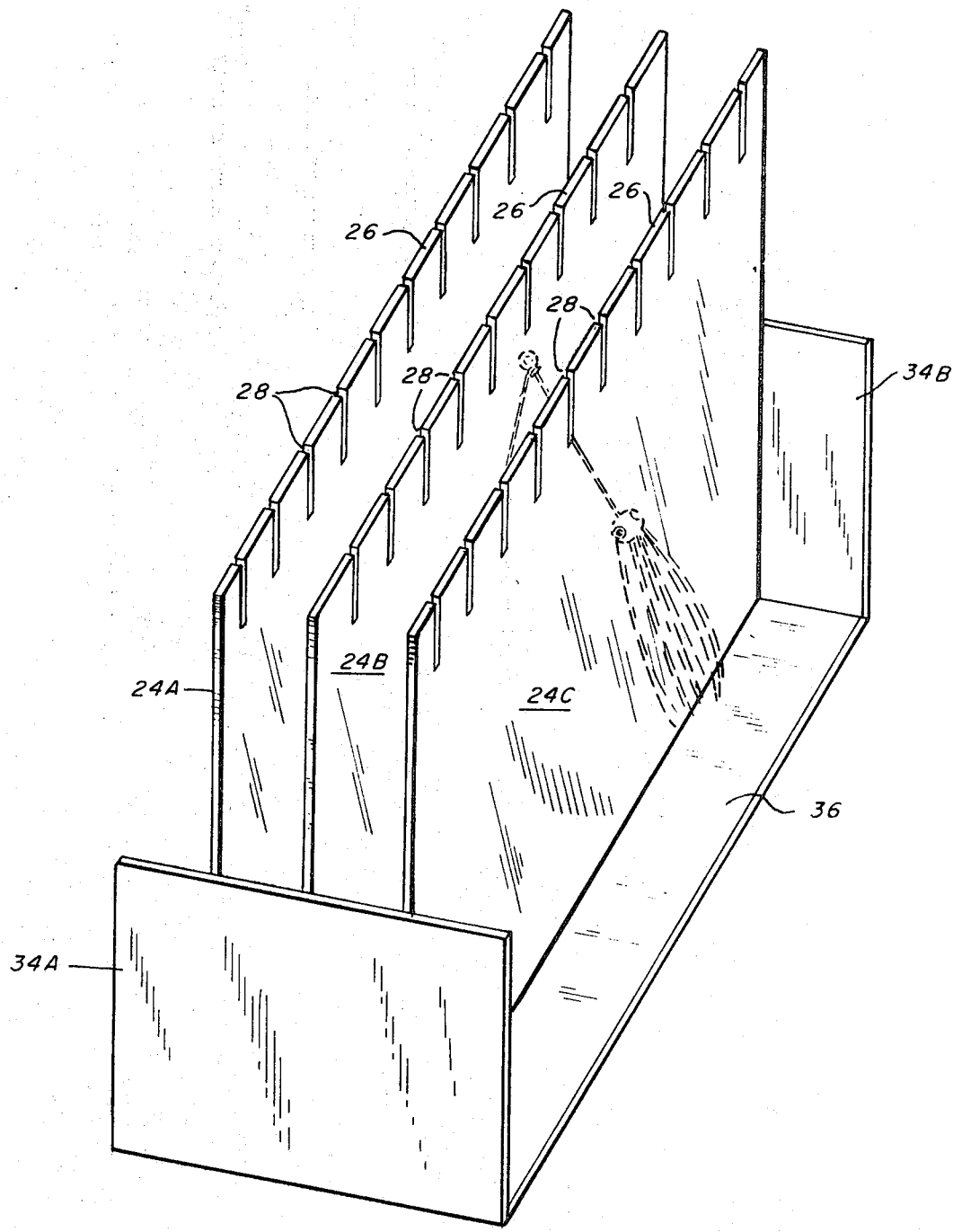
FIG. 3 is an isometric view of an embodiment of the invention in which the panels may be integrally formed as a removable unit.

In the arrangement of FIG. 2 the panels 24A, 24B and 24C are all integrally affixed at their lower ends to the box bottom interior surface 20. An alternate arrangement is illustrated in FIG. 3. In this arrangement the panels 24A, 24B and 24C are formed as a removable, integral unit which can be removed from the box lower portion 10 when desired. This arrangement has an advantage in that it facilitates cleaning the box and permits the box to be used for other purposes if desired.

In the arrangement of FIG. 3 the panels 24A, 24B and 24C may be integrally supported to each other by end panels 34A and 34B, which may extend to the top edge 26 of the panels or only partially the height of the panels as shown. Another means of integrally supporting the panels includes the use of a base 36 to which the panels 24A, 24B and 24C are integrally affixed.

In the drawings the invention is illustrated as encompassing the entire interior of a tackle box although it can be seen that the concept of this invention may be employed in only a portion of a tackle box in which the balance is designed to include trays, drawers or other well known tackle box designs for other types of fishing plugs or fishing equipment.

While the tackle box of this invention is particularly adaptable to storage of spinning type lures, it can be used to store other types. As an example, a lure formed of a body with treble hooks can be stored by placing a hook in a slot 28 and allowing the body to hang down between the panels.

While the invention has been described with a certain degree of particularity, it is manifest that many changes may be made in the details of construction and the arrangement of components without departing from the spirit and scope of this disclosure. While three panels 24A, 24B and 24C are shown it is apparent that one, two, three, four or more panels may be employed. It is understood that this invention is not limited to the specific embodiments set forth herein for purposes of exemplification, but is limited only by the scope of the attached claim or claims, including the full range of equivalency to which each element or step thereof is entitled.

What is claimed:

1. A tackle box for housing fishing lures having shanks and hooks and comprising an outer housing having upper and lower box-like portions having the adjacent faces thereof open and hingedly secured together along one edge to provide alternate open and closed positions for the tackle box, a plurality of spaced mutually parallel upstanding partitions removably secured in said lower box-like portion and having the outer edge thereof extending beyond the open face of the lower box-like portion and into the upper box-like portion with substantially half of each partition exposed in the open position of the tackle box, each of said partitions being provided with a plurality of slots spaced along the outer edge thereof and open for receiving the shank of a fishing lure therein whereby the hook of the lure is disposed downwardly away from the outer edges of the partitions, said slots of one partition being positioned out of register with the slots of the adjacent partitions for reducing interference between the lures secured thereto, resilient cushioning means provided on the inner periphery of the top of the upper box-like portion for engaging the outer end of the partitions in the closed position of the tackle box to securely retain the fishing lures in position in the slots, latch means cooperating between the upper and lower box-like portions for releasably securing the housing in the closed position thereof, and handle means secured to the outer housing for facilitating portability of the tackle box.

2. A tackle box as set forth in claim 1 wherein said partitions are integrally constructed to provide a composite unit removably disposed within said lower box-like portion.

* * * * *